United States Patent
Bellet et al.

(10) Patent No.: US 7,063,873 B2
(45) Date of Patent: *Jun. 20, 2006

(54) POLYAMIDE- AND EVOH-BASED MULTILAYER TUBE FOR FLUID TRANSFER

(75) Inventors: Gaëlle Bellet, Evreux (FR); Anthony Bonnet, Serquigny (FR); Joachim Merziger, Evreux (FR)

(73) Assignee: Arkema, Puteaux (FR)

( * ) Notice: Subject to any disclaimer, the term of this patent is extended or adjusted under 35 U.S.C. 154(b) by 172 days.

This patent is subject to a terminal disclaimer.

(21) Appl. No.: 10/104,493

(22) Filed: Mar. 25, 2002

(65) Prior Publication Data

US 2002/0155242 A1 Oct. 24, 2002

(30) Foreign Application Priority Data

Mar. 23, 2001 (FR) .................................. 01 03931

(51) Int. Cl.
- *B29D 22/00* (2006.01)
- *B29D 23/00* (2006.01)
- *B32B 1/08* (2006.01)

(52) U.S. Cl. ............... 428/36.91; 428/36.7; 428/474.9; 428/476.9

(58) Field of Classification Search ............... 428/36.7, 428/36.91, 474.9, 476.3, 476.9
See application file for complete search history.

(56) References Cited

U.S. PATENT DOCUMENTS

| 4,816,304 A | * | 3/1989 | Nohara et al. ............. 428/36.7 |
| 6,302,153 B1 | * | 10/2001 | Merziger .................... 138/137 |
| 6,555,243 B1 | * | 4/2003 | Flepp et al. ............. 428/474.4 |

FOREIGN PATENT DOCUMENTS

| EP | 0517453 A1 | * | 12/1992 |
| EP | 0731308 | | 9/1996 |
| FR | 2765520 | | 1/1999 |
| WO | 96/13680 | | 5/1996 |

* cited by examiner

*Primary Examiner*—Michael Miggins
(74) *Attorney, Agent, or Firm*—Millen White Zelano & Branigan, P.C.

(57) ABSTRACT

A multiplayer tube comprising: an outer layer formed from a polyamide, a layer formed from a copolyamide, a layer formed from an EVOH, a layer formed from a copolyamide, and an inner layer formed from a polyamide, the layers being successive and adhering to one another in their respective contact region. Advantageously, the inner layer is formed by a compound based on a polyamide and electrically conducting carbon black, producing a surface resistivity of less than $10^6$ Ω. The tubes have a very low permeability to petrol, particularly to hydrocarbons and their additives, and in particular to alcohols, such as methanol and ethanol, or to ethers, such as MTBE or ETBE. These tubes also have good resistance to engine lubricating oils as well as fuels.

11 Claims, No Drawings

POLYAMIDE- AND EVOH-BASED MULTILAYER TUBE FOR FLUID TRANSFER

FIELD OF THE INVENTION

The present invention relates to tubes (synonymously-"hoses"), based on polyamides and EVOH (an ethylene/vinyl alcohol copolymer) for fluid transfer.

BACKGROUND OF THE INVENTION

As examples of tubes for fluid transfer may be mentioned hose for transporting petrol (synonymously "gasoline"), and in particular for conveying the petrol from the tank to the engine of a motor vehicle. As other examples of fluid transfer may be mentioned: the fluids involved in a fuel cell, the CO2 system for cooling and air conditioning, the hydraulic lines, the cooling circuit, other air conditioning systems and for intermediate pressure power transfer.

For safety and environmental protection reasons, motor-vehicle manufacturers require these tubes to have both mechanical properties such as strength and flexibility with good cold (−40° C.) impact strength as well as good high-temperature (125° C.) strength, and also very low permeability to hydrocarbons and to their additives, particularly alcohols such as methanol and ethanol. These tubes must also have good resistance to the fuels and lubrication oils for the engine. These tubes are manufactured by coextruding the various layers using standard techniques for thermoplastics.

Among the characteristics of the specification for petrol tubes, five are particularly difficult to obtain jointly in a simple manner:
cold (−40° C.) impact strength—the tube does not break;
fuel resistance;
high-temperature (125° C.) strength;
very low permeability to petrol;
good dimensional stability of the tube in use with the petrol.

In multilayer tubes of various structures, the cold impact strength remains unpredictable before having carried out the standardized tests for cold impact strength.

Moreover, it is already known from Patent Application EP 0 781 799 that in motor vehicles, under the effect of the injection pump, the petrol flows at high speed in the pipes connecting the engine to the tank. In certain cases, the friction between the petrol and the internal wall of the tube can generate electrostatic charges, the accumulation of which may result in an electrical discharge (a spark) capable of igniting the petrol with catastrophic consequences (an explosion). It is therefore necessary to limit the surface resistivity of the internal face of the tube to a value of generally less than $10^6$ ohms/square. It is known to lower the surface resistivity of polymeric resins or materials by incorporating conductive and/or semiconductive materials into them, such as carbon black, steel fibres, carbon fibres, and particles (fibres, platelets or spheres) metallized with gold, silver or nickel.

Among these materials, carbon black is more particularly used, for economic and processability reasons. Apart from its particular electrically conductive properties, carbon black behaves as a filler such as, for example, talc, chalk or kaolin. Thus, those skilled in the art know that when the filler content increases, the viscosity of the polymer/filler blend increases. Likewise, when the filler content increases, the flexural modulus of the filled polymer increases. These known and predictable phenomena are explained in "Handbook of Fillers and Reinforcements for Plastics", edited by H. S. Katz and J. V. Milewski—Van Nostrand Reinhold Company—ISBN 0-442-25372-9, see in particular Chapter 2, Section II for fillers in general and Chapter 16, Section VI for carbon black in particular.

As regards the electrical properties of carbon black, the technical report "Ketjenblack EC—BLACK 94/01" by Akzo Nobel indicates that the resistivity of the formulation drops very suddenly when a critical carbon black content, called the percolation threshold, is reached. When the carbon black content increases further, the resistivity rapidly decreases until reaching a stable level (plateau region). It is therefore preferred, for a given resin, to operate in the plateau region in which a metering error will have only a slight effect on the resistivity of the compound.

Polyamide- and EVOH-based tubes for transporting petrol are also known from Patent Application EP 0 731 308. These tubes may have a four-layer structure comprising, respectively, a PA-12 outer layer, a binder layer, which is a grafted polyolefin, an EVOH layer and an inner layer in contact with the petrol, comprising a blend of a polyamide and a polyolefin having a polyamide matrix.

Patent EP 428833 describes a three-layer tube comprising, respectively, a PA-12 outer layer, a binder layer which is a grafted polyolefin and an EVOH inner layer in contact with the petrol.

Patents EP 428834 and EP 477606 describe a five-layer tube comprising, respectively, a PA-12 outer layer, a binder layer which is a grafted polyolefin, a PA-6 layer, an EVOH layer and a PA-6 inner layer in contact with the petrol.

U.S. Pat. No. 5,038,833 describes a three-layer tube comprising, respectively, a PA-12 outer layer, an EVOH layer and a PA-12 inner layer in contact with the petrol.

All these tubes have good properties but the thickness of the binder layers is not easy to control and as a result, there may be delaminations. In the tube described in U.S. Pat. No. 5,038,833, there is no binder but delaminations do occur.

A multilayer tube comprising a polyamide outer layer, a copolyamide binder layer, an EVOH layer, another copolyamide binder layer and a polyamide inner layer in contact with the petrol respectively, has now been found. The copolyamide binder is particularly effective and is also easy to coextrude.

SUMMARY OF THE INVENTION

The present invention relates to a multilayer tube comprising, in its radial direction from the outside inwards:
an outer layer formed from a polyamide,
a layer formed from a copolyamide,
a layer formed from an EVOH,
a layer formed from a copolyamide,
an inner layer formed from a polyamide, the layers being successive and preferably adhering to one another in their respective contact regions.

Advantageously, the inner layer is formed by a compound based on a polyamide and electrically conducting carbon black, producing a surface resistivity of less than $10^6$ Ω/□.

The outside diameter of these tubes may range from 6 to 110 mm and the wall thickness may be from 0.5 to 5 mm.

Preferably, the petrol tube according to the invention has an outside diameter ranging from 6 to 12 mm and a total wall thickness of 0.36 mm to 1.95 mm, namely:
a preferred thickness 50 to 700 μm for the polyamide outer layer,
a preferred thickness of 10 to 150 μm for the copolyamide layers,
a preferred thickness of 10 to 200 μm for the EVOH layer, a preferred thickness of 100 to 500 μm for the polyamide inner layer possibly filled with electrically conducting carbon black.

The tube of the present invention has a very low permeability to petrol, particularly to hydrocarbons and their additives, and in particular to alcohols, such as methanol and ethanol, or to ethers, such as MTBE or ETBE. These tubes also have good resistance to engine lubrication oils and fuels.

This tube has very good mechanical properties at low or high temperature.

The tube of the invention may include an additional layer consisting of manufacturing scrap or of defective tubes of the invention, this scrap or these tubes being ground and then melted and coextruded with the other layers. This additional layer may lie between the outer layer and the copolyamide layer.

With regard to the outer layer, polyamide is understood to mean a product resulting from the condensation:

of one or more amino acids, such as aminocaproic, 7-amino-heptanoic, 11-amino-undecanoic and 12-amino-dodecanoic acids, or of one or more lactams, such as caprolactam, oenantholactam and lauryllactam;

of one or more salts or mixtures of diamines, such as hexamethylenediamine, dodecamethylenediamine, metaxylyenediamine, bis-p-(aminocyclohexyl)methane and trimethylhexamethylenediamine, with diacids, such as isophthalic, terephthalic, adipic, azelaic, suberic, sebacic and dodecanedicarboxylic acids;

or mixtures of several of these monomers, which results in copolyamides.

Aliphatic diamines are α,ω-diamines containing, between the amino terminal groups, at least 6 carbon atoms, preferably 6 to 10 carbon atoms. The carbon chain may be linear (polymethylenediamine) or branched or even cycloaliphatic. Preferred diamines are hexamethylenediamine (HMDA), dodecamethylenediamine and decamethylenediamine.

The dicarboxylic acids may be aliphatic, cycloaliphatic or aromatic. The aliphatic dicarboxylic acids are α,ω-dicarboxylic acids having at least 4, preferably at least 6, carbon atoms (excluding the carbon atoms of the carboxylic groups) in the linear or branched carbon chain. The diacids are azelaic, sebacic and 1,12-dodecanoic acids. As an illustration of such PAs, mention may be made of:

polyhexamethylene sebacamide (PA-6,10),
polyhexamethylene dodecanediamide (PA-6,12),
poly(undecanoamide) (PA-11),
poly(lauryllactam) (2-azacyclotridecanone) (PA-12),
polydodecamethylene dodecanediamide (PA-12,12),
polycapronamide (PA-6),
polyhexamethylene adipamide (PA-6,6).

It is possible to use polyamide blends. Advantageously, PA-6, PA-6,6, PA 11 and PA-12 are used.

The PAs have a number-average molecular mass $\overline{M}_n$ generally greater than or equal to 5000. Their inherent viscosity (measured at 20° C.) for a 0.5 g sample in 100 g of meta-cresol) is in general greater than 0.7.

Preferably, PA-12 (nylon-12) is used. Advantageously, the polyamide of the outer layer is plasticized by standard plasticizers such as n-butyl benzene sulphonamide (BBSA) and copolymers comprising polyamide blocks and polyether blocks.

The copolymers having polyamide blocks and polyether blocks result from the copolycondensation of polyamide blocks having reactive ends with polyether blocks having reactive ends, such as, inter alia:

1) polyamide blocks having diamine chain ends with polyoxyalkylene blocks having dicarboxylic chain ends;
2) polyamide blocks having dicarboxylic chain ends with polyoxyalkylene blocks having diamine chain ends, obtained by cyanoethylation and hydrogenation of aliphatic dihydroxylated alpha, omega-polyoxyalkylene blocks called polyetherdiols;
3) polyamide blocks having dicarboxylic chain ends with polyetherdiols, the products obtained being, in this particular case, polyetheresteramides.

Advantageously, these copolymers are used.

Polyamide blocks having dicarboxylic chain ends derive, for example, from the condensation of alpha, omega-aminocarboxylic acids, of lactams or of dicarboxylic acids and diamines in the presence of a chain-stopping dicarboxylic acid.

Polyamide blocks having diamine chain ends derive, for example, from the condensation of alpha, omega-aminocarboxylic acids, of lactams or of dicarboxylic acids and diamines in the presence of a chain-stopping diamine. The polyether may, for example, be a polyethylene glycol (PEG), a polypropylene glycol (PPG) or a polytetramethylene glycol (PTMG). The latter is also called polytetrahydrofuran (PTHF).

The number-average molar mass $\overline{M}_n$ of the polyamide blocks is between 300 and 15 000 and preferably between 600 and 5000. The mass $\overline{M}_n$ of the polyether blocks is between 100 and 6000 and preferably between 200 and 3000.

Polymers having polyamide blocks and polyether blocks may also include randomly distributed units. These polymers may be prepared by the simultaneous reaction of the polyether and polyamide-block precursors.

For example, it is possible to react polyetherdiol, a lactam (or an alpha, omega-amino acid) and a chain-stopping diacid in the presence of a small amount of water. A polymer is obtained having essentially polyether blocks and polyamide blocks of very variable length, but also the various reactants, having reacted in a random fashion, which are distributed randomly along the polymer chain.

These polymers having polyamide blocks and polyether blocks, whether they derive from the copolycondensation of polyamide and polyether blocks prepared beforehand or from a one-step reaction, have, for example, Shore D hardnesses which may be between 20 and 75 and advantageously between 30 and 70 and an intrinsic viscosity of between 0.8 and 2.5 measured in meta-cresol at 25° C. for an initial concentration of 0.8 g/100 ml. The MFIs may be between 5 and 50 (235° C., with a load of 1 kg).

The polyetherdiol blocks are either used as such and copolycondensed with polyamide blocks having carboxylic ends or they are aminated in order to be converted into diamine polyethers and condensed with polyamide blocks having carboxylic ends. They may also be mixed with polyamide precursors and a chain stopper in order to make polyamide-block polyether-block polymers having randomly distributed units.

Polymers having polyamide and polyether blocks are described in U.S. Pat. No. 4,331,786, U.S. Pat. No. 4,115, 475, U.S. Pat. No. 4,195,015, U.S. Pat. No. 4,839,441, U.S. Pat. No. 4,864,014, U.S. Pat. No. 4,230,838 and U.S. Pat. No 4,332,920.

The ratio of the amount of copolymer having polyamide blocks and polyether blocks to the amount of polyamide is, by weight, advantageously between 10/90 and 60/40. Mention may also be made, for example, of copolymers having PA-6 blocks and PTMG blocks and copolymers having PA-12 blocks and PTMG blocks.

With regard to the copolyamide layers, the copolyamides that can be used in the present invention have a melting point (DIN 53736B standard) of between 60 and 200° C. and their relative solution viscosity can be between 1.3 and 2.2 (DIN 53727 standard; m-cresol solvent, 0.5 g/100 ml concentration, 25° C. temperature, Ubbelohde viscometer). Their melt rheology is preferably similar to that of the materials of the outer and inner layers.

The copolyamides derive, for example, from the condensation of alpha,omega-aminocarboxylic acids, of lactams or of dicarboxylic acids and diamines.

According to a first type, the copolyamides result from the condensation of at least two alpha,omega-aminocarboxylic acids or of at least two lactams having from 6 to 12 carbon atoms or of a lactam and of an aminocarboxylic acid not having the same number of carbon atoms, in the possible presence of a chain stopper which may, for example, be a monoamine or a diamine or a monocarboxylic acid or a dicarboxylic acid. Among chain stoppers, mention may be made in particular of adipic acid, azelaic acid, stearic acid and dodecanediamine.

By way of examples of dicarboxylic acids, mention may be made of adipic acid, nonanedioic acid, sebacic acid and dodecanedioic acid.

By way of examples of alpha,omega-aminocarboxylic acids, mention may be made of aminocaproic acid, aminoundecanoic acid and aminododecanoic acid.

By way of examples of lactams, mention may be made of caprolactam and lauryllactam (2-azacyclotridecanone).

According to a second type, the copolyamides result from the condensation of at least one alpha,omega-aminocarboxylic acid (or a lactam), at least one diamine and at least one dicarboxylic acid. The alpha,omega-aminocarboxylic acid, the lactam and the dicarboxylic acid may be chosen from those mentioned above.

The diamine may be a branched, linear or cyclic aliphatic diamine or else an aryl-type diamine.

By way of examples, mention may be made of hexamethylenediamine, piperazine, isophoronediamine (IPD), methylpentamethylenediamine (MPDM), bis(aminocyclohexyl)-methane (BACM) and bis(3-methyl-4-aminocyclohexyl)methane (BMACM).

By way of examples of copolyamides, mention may be made of the following:

a) 6/12/IPD.6 in which:

6 denotes units resulting from the condensation of caprolactam, 12 denotes units resulting from the condensation of lauryllactam (2-azacyclotridecanone), IPD.6 denotes units resulting from the condensation of isophoronediamine and adipic acid. The proportions by weight are 20/65/15, respectively.

The melting point is between 125° C. and 135° C.

b) 6/6,6/12 in which:

6 denotes units resulting from the condensation of caprolactam, 6,6 denotes hexamethyleneadipamide (hexamethylene diamine condensed with adipic acid) units.

12 denotes units resulting from the condensation of lauryllactam (2-azacyclotridecanone).

The proportions by weight are respectively 40/20/40.

The melting point is between 115° C. and 127° C.

c) pip.12/pip.9/11 in which:

pip.12 denotes units resulting from the condensation of piperazine and a $C^{12}$ diacid;

pip.9 denotes units resulting from the condensation of piperazine and a $C^9$ diacid;

11 denotes units resulting from the condensation of aminoundecanoic acid, the proportions be weight are 35/35/30, respectively.

The processes for manufacturing copolyamides are known from the prior art and these copolyamides may be manufactured by polycondensation, for example in an autoclave.

According to a third type the copolyamides are a mixture of a copolyamide 6/12 rich in 6 and of a copolyamide 6/12 rich in 12. With regard to the blend of PA-6/12 copolyamides, one comprising by weight more PA-6 than PA-12 and the other more PA-12 than PA-6, the PA-6/12 copolyamide results from the condensation of caprolactam with lauryllactam. It is clear that "6" denotes the units derived from caprolactam and "12" denotes the units derived from lauryllactam. It would not be outside the scope of the invention if caprolactam were to be replaced entirely or partly with aminocaproic acid, and likewise lauryllactam could be replaced with aminododecanoic acid. These copolyamides may include other units, provided that the ratio of the PA-6 and PA-12 proportions are respected.

Advantageously, the copolyamide rich in PA-6 comprises 60 to 90% by weight of PA-6 for 40 to 10% of PA-12, respectively.

Advantageously, the copolyamide rich in PA-12 comprises 60 to 90% by weight of PA-12 for 40 to 10% of PA-6, respectively.

As regards the proportions of the copolyamide rich in PA-6 and of the copolyamide rich in PA-12, these may be, by weight, from 40/60 to 60/40 and preferably 50/50.

These copolyamide blends may also include up to 30 parts by weight of other grafted polyolefins or (co)polyamides per 100 parts of copolyamides rich in PA-6 and rich in PA-12.

These copolyamides have a melting point (DIN 53736B standard) of between 60 and 200° C. and their relative solution viscosity may be between 1.3 and 2.2 (DIN 53727 standard; m-cresol solvent, 0.5 g/100 ml concentration, 25° C. temperature, Ubbelohde viscometer). Their melt rheology is preferably similar to that of the materials of the adjacent layers. These products are manufactured by the standard techniques for polyamides. Processes are described in U.S. Pat. No. 4,424,864, U.S. Pat. No. 4,483,975, U.S. Pat. No. 4,774,139, U.S. Pat. No. 5,459,230, U.S. Pat. No. 5,489,667, U.S. Pat. No. 5,750,232 and U.S. Pat. No. 5,254,641.

With regard to the layer formed from EVOH copolymer, this may consist of EVOH or of an EVOH-based blend. EVOH is also referred to as a saponified ethylene/vinyl acetate copolymer. The saponified ethylene/vinyl acetate copolymer to be used according to the present invention is a copolymer having an ethylene content of 20 to 70 mol %, preferably 25 to 70 mol %, the degree of saponification of its vinyl acetate component not being less than 95 mol %. With an ethylene content of less than 20 mol %, the barrier properties under high-humidity conditions are not as high as would be desired, whereas an ethylene content exceeding 70 mol % results in reduced barrier properties. When the degree of saponification or hydrolysis is less than 95 mol %, the barrier properties are sacrificed.

The expression "barrier properties" is understood to mean the impermeability to gases and liquids, and in particular to oxygen and to petrol for motor vehicles.

Among these saponified copolymers, those which have melt flow indices within the 0.5 to 100 g/10 min. range are particularly useful. Advantageously, the MFI is chosen between 5 and 30 g/10 min. (at 230° C./2.16 kg), "MFI" is the Abbreviation for "Melt Flow Index".

It is known that this saponified copolymer may contain small amounts of other comonomer ingredients, including α-olefins, such as propylene, isobutene, α-octene, α-dodecene, α-octadecene, etc., unsaturated carboxylic acids or their salts, partial alkyl esters, complete alkyl esters, nitrites, amides and anhydrides of the said acids, and unsaturated sulphonic acids and salts thereof.

As regards the EVOH-based blends, these are such that the EVOH forms the matrix, that is to say it represents at least 40% and preferably at least 50% by weight of the blend. The other constituents of the blend are chosen from polyolefins, polyamides and possibly functional polymers.

As a first example of these EVOH-based blends, mention may be made of the following compositions (by weight):
- 55 to 99.5 parts of EVOH copolymer;
- 0.5 to 45 parts of polypropylene and compatibilizer, their proportions being such that the ratio of the amount of polypropylene to the amount of compatibilizer is between 1 and 5.

Advantageously, the radio of the MFI of the EVOH to the MFI of the polypropylene is greater than 5 and preferably between 5 and 25. Advantageously, the MFI of the polypropylene is between 0.5 and 3 (in g/10 min. at 230° C./2.16 kg). According to an advantageous embodiment, the compatibilizer is a polyethylene carrying grafted polyamide species and it results from the reaction of (i) a copolymer of ethylene and a grafted or copolymerized unsaturated monomer X with (ii) a polyamide. The copolymer of ethylene and a grafted or copolymerized unsaturated monomer X is such that X is copolymerized and it may be chosen from ethylene/maleic anhydride copolymers and ethylene/alkyl (meth) acrylate/maleic anhydride copolymers, these copolymers comprising from 0.2 to 10% by weight maleic anhydride and from 0 to 40% by weight alkyl (meth)acrylate. According to another advantageous embodiment, the compatibilizer is a polypropylene carrying grafted polyamide species which result from the reaction of (i) a propylene homopolymer or a propylene copolymer comprising a grafted or copolymerized, unsaturated monomer X with (ii) a polyamide. Advantageously, X is grafted. The monomer X is advantageously an unsaturated carboxylic acid anhydride such as, for example, maleic anhydride.

As a second example of these EVOH-based blends, mention may be made of the compositions comprising:
- 50 to 98% by weight of an EVOH copolymer;
- 1 to 50% by weight of a polyethylene;
- 1 to 15% by weight of a compatibilizer consisting of a blend of an LLDPE or metallocene polyethylene and a polymer chosen from elastomers, very low-density polyethylenes and metallocene polyethylenes, the blend being cografted by an unsaturated carboxylic acid or a functional derivative of this acid.

Advantageously, the compatibilizer is such that the $MFI_{10}/MFI_2$ ratio is between 5 and 20, where $MFI_2$ is the melt flow index at 190° C. with a load of 2.16 kg, measured according to ASTM D1238, and $MFI_{10}$ is the melt flow index at 190° C. with a load of 10 kg according to ASTM D1238.

As a third example of these EVOH-based blends, mention may be made of the compositions comprising:
- 50 to 98% by weight of an EVOH copolymer;
- 1 to 50% by weight of an ethylene/alkyl (meth) acrylate copolymer;
- 1 to 15% by weight of a compatibilizer resulting from the reaction of (i) a copolymer of ethylene and a grafted or copolymerized unsaturated monomer X with (ii) a copolyamide.

Advantageously, the copolymer of ethylene and a grafted or copolymerized unsaturated monomer X is such that X is copolymerized, and it is an ethylene/maleic anhydride copolymer or an ethylene/alkyl (meth)acrylate/maleic anhydride copolymer. Advantageously, these copolymers comprise from 0.2 to 10% by weight of maleic anhydride and from 0 to 40% by weight of alkyl (meth)acrylate.

With regard to the inner layer made of polyamide, this may be chosen from the polyamides mentioned in respect of the outer layer. This polyamide may, like that of the outer layer, be plasticized by standard plasticizers such as n-butyl benzene sulphonamide (BBSA) and copolymers comprising polyamide blocks and polyether blocks. Advantageously, PA-12 or PA-11 is used. According to one particular embodiment, the polyamide of this inner layer is not plasticized.

It may also contain carbon black, advantageously in a sufficient amount for the surface resistivity to be less than $10^6$ Ω/□. This amount of black is usually between 5 and 30 parts by weight of black per 100 parts of the combination of the polyamide and its plasticizers and other additives.

These multilayer tubes may be cylindrical with a constant diameter or may be annulate.

Conventionally, these tubes may include protective sheaths, especially made of rubber, in order to protect them from engine hot spots.

In the foregoing and in the following examples, all temperatures are set forth uncorrected in degrees Celsius; and, unless otherwise indicated, all parts and percentages are by weight.

Tubes with an outside diameter of 8 mm and wall thickness of 1 mm were manufactured by coextrusion.

EXAMPLE NO. 1

Tube No. 1

The outer layer with a thickness of 500 μm consists of a polyamide, the formulation of which is as follows:
- 85% of nylon-12 (PA-12) having an inherent viscosity of 1.65;
- 7% of n-butylbenzene sulphonamide (BBSA)
- 6% of a thermoplastic elastomer having polyamide blocks and polyether blocks, with a Shore D hardness of 55 and a melting point of 159° C.
- 2% of additives (colorants, lubricants and stabilizers).

The inner layer with a thickness of 300 μm is identical to the outer layer.

The copolyamide layers have a thickness of 50 μm and consist of a blend (50%/50% by weight) of PLATAMID® 1 and PLATAMID® 2. PLATAMID®1 is a copolyamide produced by the polycondensation of 60% by weight of lauryllactam and 40% by weight of caprolactam. This copolyamide has a melting point range of 130–140° C. (DIN 53736 B standard) and a relative solution viscosity of 1.75–1.90 (according to the DIN 53727 standard, m-cresol, 0.5 g/100 ml, 25° C., Ubbelohde viscometer) and PLATAMID® 2 is a copolyamide produced by the polycondensation of 30% by weight of lauryllactam and 70% by weight of caprolactam. This copolyamide has a melting point range of 185–190° C. (DIN 53736 B standard) and a relative solution viscosity of 1.90 (according to the DIN 53727 standard, m-cresol, 0.5 g/100 ml, 25° C., Ubbelohde viscometer).

EXAMPLE NO. 2

Tube No. 2

The outer layer with a thickness of 500 μm consists of the same polyamide as the outer layer of the above tube.

The inner layer with a thickness of 300 μm is a compound of 100 parts by weight of the composition of the outer layer and 27 parts by weight of carbon black. The black ENSACO® 250 from MMM Carbon was used (this black having an adsorption surface area of 65 m$^2$/g, a primary particle size of 38 nm and an aggregate size of about 600 nm).

The copolyamide layers are the same as in the previous tube (same thickness and composition). In general, it is preferred that the copolyamide layers have a thickness which is less than the inner and outer layers.

In the context of the above description, the word "advantageously" is to be understood as synonymous to "preferably" and the term "such as" is to be understood as synonymous to, "for example". Thus, the aforementioned words and terms are not limiting of the invention.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 01/03.931, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

The invention claimed is:

1. A multilayer tube comprising, in its radial direction from the outside inwards:
   an outer layer formed from a polyamide,
   a layer formed from a copolyamide,
   a layer formed from an EVOH,
   a layer formed from a copolyamide,
   an inner layer formed from a polyamide,
   the layers being successive, with the proviso that the copolyamide of the layers adjacent to the EVOH layer is a blend of a 6/12-copolyamide rich in 6 and of a 6/12-copolyamide rich in 12 wherein rich means over 50% by weight.

2. Tube according to claim 1, in which the inner layer contains carbon black in an amount sufficient to produce a surface resistivity of less than $10^6$ Ω/□.

3. A tube according to claim 1, in which the polyamide of the inner layer is polyamide-11 or polyamide-12.

4. A tube according to claim 1, in which the copolyamide rich in PA-12 comprises 60 to 90% by weight of PA-6 for 40 to 10% of PA-12 respectively.

5. A tube according to claim 1, in which the copolyamide rich in PA-12 comprises 60 to 90% by weight of PA-12 for 40 to 10% of PA-6 respectively.

6. A tube according to claim 1, in which the proportions of the copolyamide rich in PA-6 and of the copolyamide rich in PA-12 are from 40/60 to 60/40 by weight.

7. A tube according to claim 1, in which the polyamide of the outer layer is polyamide-11 or polyamide-12.

8. A tube according to claim 7, in which the polyamide of the inner layer is polyamide-11 or polyamide-12.

9. A tube according to claim 1, having the following thicknesses of the layers:
   a thickness of 50 to 700 μm for the polyamide outer layer,
   a thickness of 10 to 150 μm for the copolyamide layers,
   a thickness of 10 to 200 μm for the EVOH layer,
   a thickness of 100 to 500 μm for the polyamide inner layer.

10. A tube according to claim 9, wherein the copolyamide layers have a smaller thickness than the inner and outer layers.

11. A tube according to claim 10, in which the inner layer contains carbon black in an amount sufficient to produce a surface resistivity of less than $10^6$ Ω/□.

* * * * *